United States Patent
Dixon et al.

(10) Patent No.: US 8,651,949 B2
(45) Date of Patent: Feb. 18, 2014

(54) TOY AND ASSOCIATED COMPUTER GAME

(75) Inventors: Mark Dixon, Tonawanda, NY (US); David Francis, East Aurora, NY (US); Brian Urbanczyk, West Seneca, NY (US)

(73) Assignee: Mattel, Inc., El Segundo, CA (US)

( * ) Notice: Subject to any disclaimer, the term of this patent is extended or adjusted under 35 U.S.C. 154(b) by 188 days.

(21) Appl. No.: 13/216,455

(22) Filed: Aug. 24, 2011

(65) Prior Publication Data

US 2012/0214589 A1    Aug. 23, 2012

Related U.S. Application Data

(60) Provisional application No. 61/379,437, filed on Sep. 2, 2010.

(51) Int. Cl.
  *A63F 9/24* (2006.01)
(52) U.S. Cl.
  USPC .............................................. 463/31; 463/32
(58) Field of Classification Search
  USPC ....................................................... 463/31, 32
  See application file for complete search history.

(56) References Cited

U.S. PATENT DOCUMENTS

| | | | |
|---|---|---|---|
| 5,766,077 A | 6/1998 | Hongo | |
| 5,853,327 A | 12/1998 | Gilboa | |
| 6,773,325 B1 | 8/2004 | Mawle et al. | |
| 6,947,571 B1 | 9/2005 | Rhoads et al. | |
| 7,001,276 B2 | 2/2006 | Shinoda | |
| 7,081,033 B1 | 7/2006 | Mawle et al. | |
| 7,261,612 B1 | 8/2007 | Hannigan et al. | |
| 7,338,377 B2 | 3/2008 | Shinoda | |
| 7,425,169 B2 | 9/2008 | Ganz | |
| 7,442,108 B2 | 10/2008 | Ganz | |
| 7,502,759 B2 | 3/2009 | Hannigan et al. | |
| 7,534,157 B2 | 5/2009 | Ganz | |
| 7,568,964 B2 | 8/2009 | Ganz | |
| 7,591,703 B2 | 9/2009 | Zielinski et al. | |
| 7,604,525 B2 | 10/2009 | Ganz | |
| 7,618,303 B2 | 11/2009 | Ganz | |
| 2002/0022507 A1 | 2/2002 | Dan et al. | |

(Continued)

FOREIGN PATENT DOCUMENTS

| | | |
|---|---|---|
| JP | 2002126345 A | 5/2002 |
| JP | 2002153674 A | 5/2002 |
| JP | 2003210836 A | 7/2003 |
| JP | 2003210843 A | 7/2003 |

*Primary Examiner* — Pierre E Elisca
(74) *Attorney, Agent, or Firm* — Edell, Shapiro & Finnan, LLC

(57) ABSTRACT

A series of co-packaged products, wherein each product includes a physical toy, action figure, or the like, along with an associated CD-ROM or other media encoded with software code or logic that includes a computer game that uses as a game character a rendering of the physical toy with which the CD-ROM is co-packaged. In an embodiment, each CD-ROM in the series includes all of the games that are associated with each respective game character in the series. Each CD-ROM is further configured, if it is a first such CD-ROM being installed on the computer, to generate and store a configuration file that indicates which ones of the game characters should be activated. Thus, once a first CD-ROM of the series is installed on the computer, a subsequent install of software encoded on another CD-ROM will result in, perhaps, only a modification of the configuration file, without having to install the entire computer game again.

22 Claims, 14 Drawing Sheets

(56) References Cited

U.S. PATENT DOCUMENTS

| | | |
|---|---|---|
| 2004/0005921 A1 | 1/2004 | Shinoda |
| 2005/0009610 A1 | 1/2005 | Miyamoto et al. |
| 2005/0059483 A1 | 3/2005 | Borge |
| 2005/0250415 A1 | 11/2005 | Barthold |
| 2005/0287925 A1 | 12/2005 | Proch et al. |
| 2006/0003843 A1 | 1/2006 | Kobayashi et al. |
| 2006/0035693 A1 | 2/2006 | Kobaysahi et al. |
| 2006/0063576 A1 | 3/2006 | Schwartz |
| 2006/0079327 A1 | 4/2006 | Clemens et al. |
| 2006/0160607 A1 | 7/2006 | Okada |
| 2006/0183543 A1 | 8/2006 | Yagi |
| 2006/0251407 A1 | 11/2006 | Thordarson et al. |
| 2008/0009351 A1 | 1/2008 | Ganz |
| 2008/0081694 A1 | 4/2008 | Hong et al. |
| 2008/0109313 A1 | 5/2008 | Ganz |
| 2008/0134099 A1 | 6/2008 | Ganz |
| 2008/0274806 A1* | 11/2008 | Ganz et al. .................. 463/31 |
| 2008/0280687 A1 | 11/2008 | Fontijn et al. |
| 2009/0053970 A1 | 2/2009 | Borge |
| 2009/0054155 A1 | 2/2009 | Borge |
| 2009/0063282 A1 | 3/2009 | Ganz |
| 2009/0137185 A1 | 5/2009 | Zheng |
| 2009/0137323 A1 | 5/2009 | Fiegener et al. |
| 2009/0197678 A1 | 8/2009 | Huang |
| 2009/0264200 A1 | 10/2009 | Schwartz |
| 2009/0291764 A1 | 11/2009 | Kirkman et al. |

* cited by examiner

CONFIGURATION FILE

| | | |
|---|---|---|
| 308 | RUDDER | 0 |
| 310 | WAVES | 1 |
| 312 | TRACKER | 0 |
| 314 | G-FORCE | 1 |
| 316 | STATIC | 0 |
| 318 | COPTER | 0 |

FIG.10

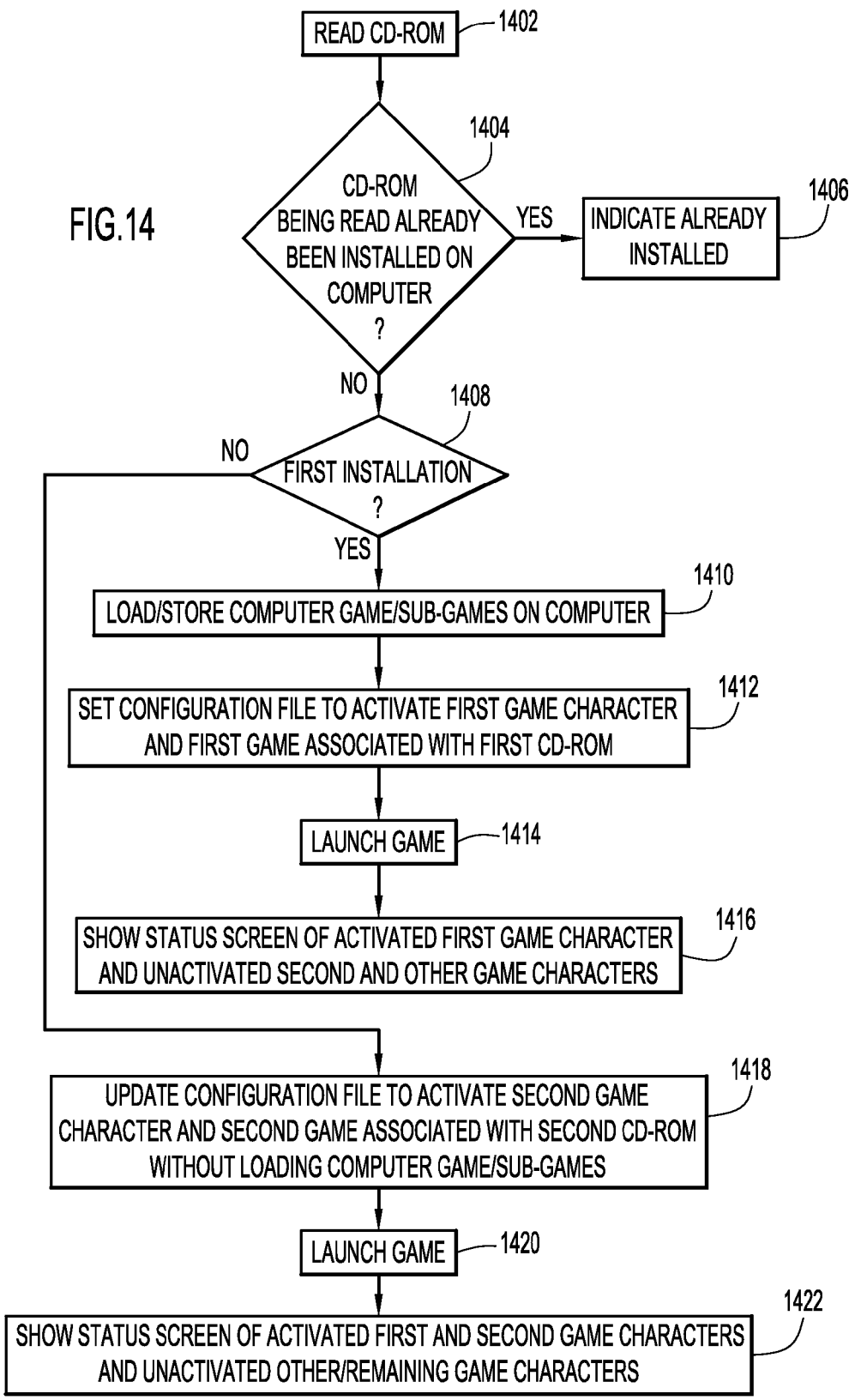

TOY AND ASSOCIATED COMPUTER GAME

CROSS-REFERENCE TO RELATED APPLICATION

This application claims the benefit of and priority under 35 U.S.C. 119(e) to U.S. Provisional Application No. 61/379,437, entitled "TOY AND ASSOCIATED COMPUTER GAME", filed Sep. 2, 2010, the disclosure of which is incorporated herein by reference in its entirety.

FIELD OF THE INVENTION

The present invention relates to a physical toy in combination with a computer game that employs a rendering of the toy as a computer game piece or character.

BACKGROUND OF THE INVENTION

Children enjoy physical toys and games. As a result, there is very large commercial market for these products. In light of this large commercial market, toy and game manufacturers and distributors have a desire to continually increase customer satisfaction, connection with brand name, and repeat customer purchases.

With the advent of the personal computer, computer games have also become increasingly popular. While there have been attempts to co-market physical toys and games with computer games, there continues to be a desire for still additional co-marketing approaches, especially where the approaches will result in increased customer satisfaction, connection with brand name, and repeat customer purchases.

SUMMARY OF THE INVENTION

Embodiments of the present invention provide a series of co-packaged products. Each co-packaged product in the series includes a physical toy, action figure, or the like, along with an associated CD-ROM or other media capable of storing software code or logic that includes a computer game that uses as a game character a rendering of the physical toy with which the CD-ROM is co-packaged.

In an embodiment, each CD-ROM in the series includes all of the games that are associated with each respective game character in the series. Further, each CD-ROM is configured, if it is a first such CD-ROM being installed on the computer, to generate and store a configuration file that indicates which ones of the game characters should be activated. Thus, once a first CD-ROM of the series is installed on the computer, a subsequent install of software encoded on another CD-ROM will result in, perhaps, only a modification of the configuration file, without having to install the entire computer game again. This substantially speeds up the install process, enabling the user to more quickly play the game.

In an embodiment, an initial screen displayed by the computer game depicts all game characters in the series, while visually indicating which ones of the game characters are active (unlocked) versus those that are inactive (locked).

These and other features of embodiments of the present invention will be more fully appreciated by those having skill in the art upon a reading of the following detailed description in conjunction with the associated drawings.

BRIEF DESCRIPTION OF THE DRAWINGS

FIG. 10 is an example configuration file stored on the computer system in accordance with an embodiment of the present invention.

FIG. 14 is an example series of steps for practicing aspects of an embodiment of the present invention.

Like reference numerals have been used to identify like elements throughout this disclosure.

DETAILED DESCRIPTION OF THE INVENTION

Figure 1:
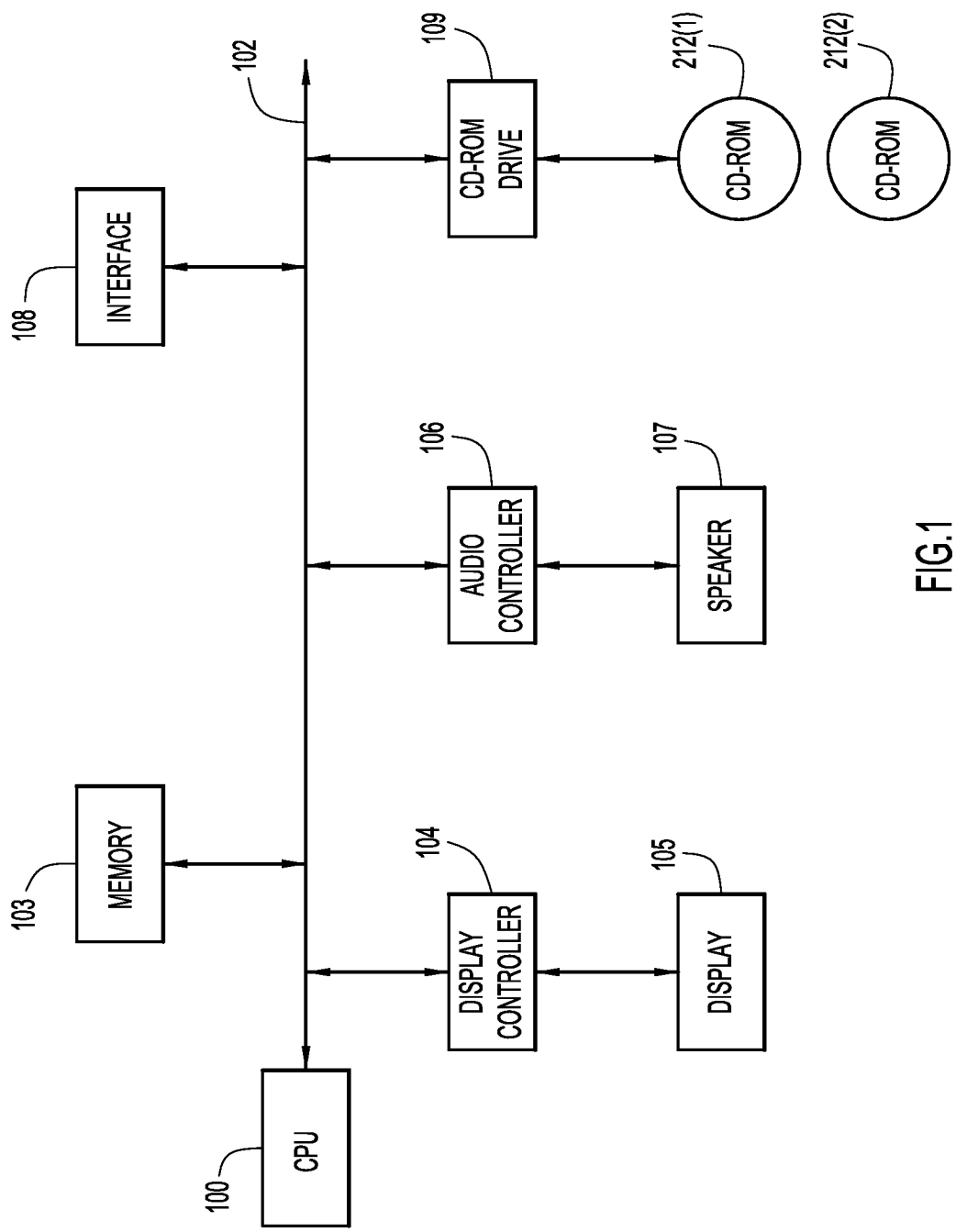
FIG. 1 depicts a computer system with which embodiments of the present invention may operate.

FIG. 1 depicts a computer system with which embodiments of the present may operate. The computer system includes a central processing unit (CPU) 100 connected to a bus 102 via which the CPU 100 can communicate with other components of the system.

The computer system further includes memory 103 which may include read only memory (ROM), random access memory (RAM), combinations of the two, or other suitable memory including a hard drive or similar devices. A display controller 104 provides graphics signals to a display 105 for, in this case, rendering views of the computer game. Likewise, an audio controller 106 provides audio signals to a speaker 107. As will be explained in more detail later herein, audio cues, output from speaker 107, help a user to understand the status of game characters.

Further, an interface module 108 is shown. Interfaces may include a keyboard, pointing device, such as a mouse, or any other like device that permits a user to provide instructions or input to the computer.

Finally, a CD-ROM drive 109 is provided. The CD-ROM drive 109 successively accepts CD-ROMs 212(1), 212(2), . . . 212(n), which, in the case of embodiments of the present invention, each includes a computer game that is loaded and run on the computer system. More particularly, and as will be explained more fully below, different CD- ROMs may be inserted and read by the computer system in order to gain access to, or unlock or activate, respective game characters. Although the use of CD-ROMs and a CD-ROM driver are described herein, there may be other media via which the computer game may be loaded onto the computer system, including USB memory "sticks," USB drives, memory cards, or any other suitable media that can store program logic (i.e., software) for the computer game. In the context of the instant description, the "computer game" may include multiple sub-games where each sub-game is associated with an individual game character. A sub-game may be a game distinct from all other sub-games, or may instead be a game that interacts with other sub-games.

Figure 2:
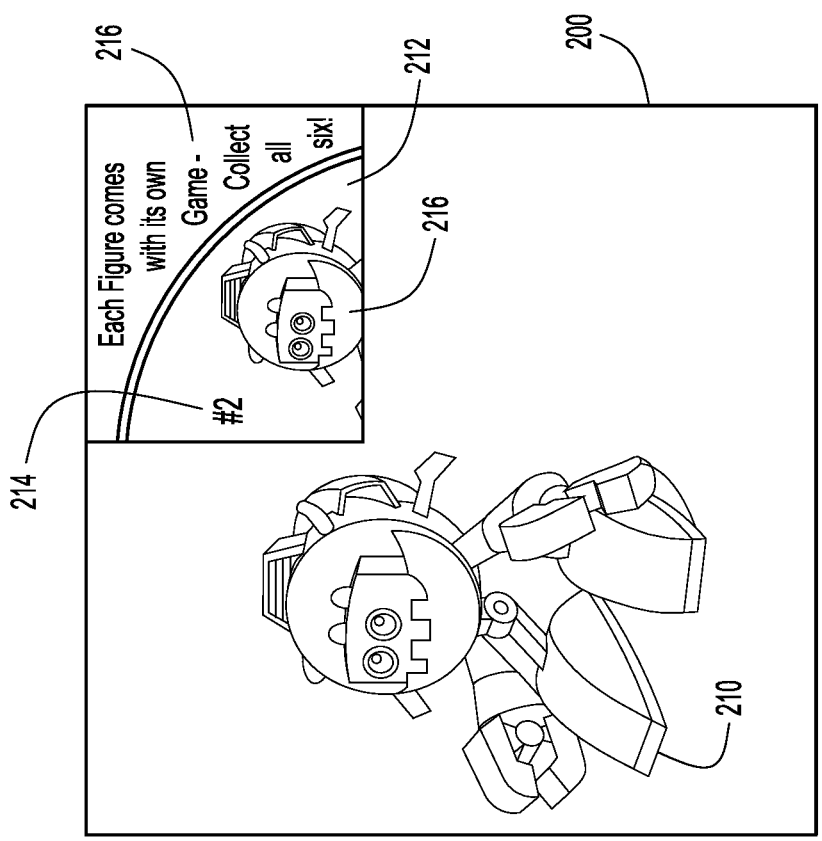
FIG. 2 shows a packaging configuration for a computer game and toy in accordance with an embodiment of the present invention.

Reference is now made to FIG. 2, which shows a co-packaging configuration for a computer game and toy in accordance with an embodiment of the present invention. As shown, a package 200 includes a toy 210 and an associated CD-ROM 212(1). The toy 210 may be, e.g., an action figure, made from, e.g., plastic or other suitable material. The toy 210 may also come with accessories (not shown) such as a jet pack, weapons, tools, or other accessories that might be suitable for the particular toy and that may enhance the enjoyment of a user, such as a child.

Combined with the toy, in the same package 200, is CD-ROM 212(1). CD-ROM 212(1) in FIG. 2 includes indicia 214 indicating that this particular CD-ROM is "#2" out of, perhaps, a total of six different toys and associated CD-ROMs combination sets. As is seen in the drawing, CD-ROM 212(1) preferably includes graphics 216 that include a rendering of the toy with which the CD-ROM 212(1) is packaged. That is, there is a clear correspondence or relationship between the CD-ROM 212(1) and the toy 210 in a given package 200. As will be explained, the CD-ROM 212(1) will unlock or activate, with the computer game, a game character that looks substantially identical to or resembles the toy with which the CD-ROM 212(1) was packaged. Indicia 216 on package 200 notify purchasers and potential purchasers of the package 200 that each action figure or toy comes with its own computer game, and that one can collect, in this particular implementation, all six of such toys and computer games.

Figure 3:
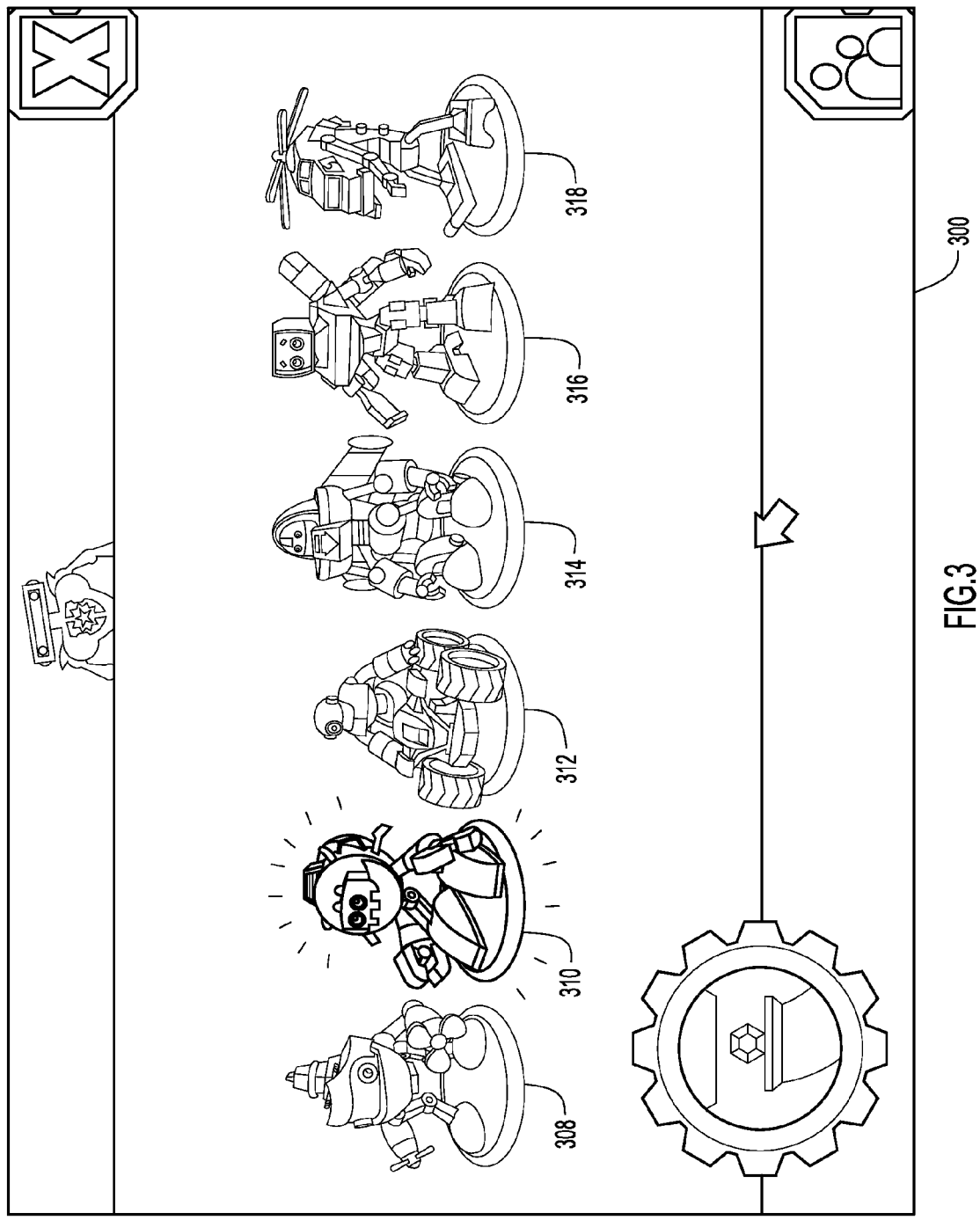
FIG. 3 is a screenshot of a game access screen in accordance with an embodiment of the present invention.

FIG. 3 is a screenshot of a game access screen 300 that, in one embodiment, is displayed once the computer game, stored on CD-ROM 212(1), is, e.g., loaded, read, stored and launched on the computer system. As shown, six different game pieces or characters 308-318 are depicted. One of the game characters, namely character 310, is indicated as being active (in the figure hash marks surround the character 310). In a color rendering, character 310 may be displayed in full color, while the other characters 308 and 312-318 may be displayed in more simple gray scale. As a result, a user has an immediate visual indication as to which ones of the game characters are active or unlocked versus those that are inactive or locked. Those that are displayed in color are unlocked and active, and those that are locked or inactive are displayed in, e.g. gray scale.

Screenshot 300 of FIG. 3 is a screen that, in an embodiment, is shown after only one of, e.g., possibly six different CD-ROMs (each corresponding to a different game character) is loaded on the computer system. Consequently, the only game character available for use, i.e., active or unlocked, is the game character that corresponds to the particular toy with which the CD-ROM 212(1) was packaged and sold.

In use, when a user manipulates a pointing device, such as a mouse, to hover over any one of the game characters shown in screenshot 300, the character may be backlit to emphasize that the pointing device is pointing to that character, and an audible cue may be provided to announce the name, and perhaps the status, of that game character. Thus, for example, if a mouse were manipulated to place a pointer over unlocked character 310, an audible announcement might be generated to play as follows: "Waves" (which is the character's name). The announcement might also say: "Waves is unlocked and ready for action." If a user were to click on this character, a game character status screen (see screenshot 400 of FIG. 4) may be displayed. This game character status screenshot 400 may act as a gateway to an actual interactive game, as will be explained later herein. Alternatively, in another possible embodiment, clicking on the active character 310 may immediately initiate an interactive game associated with the game character 310.

Figure 11:
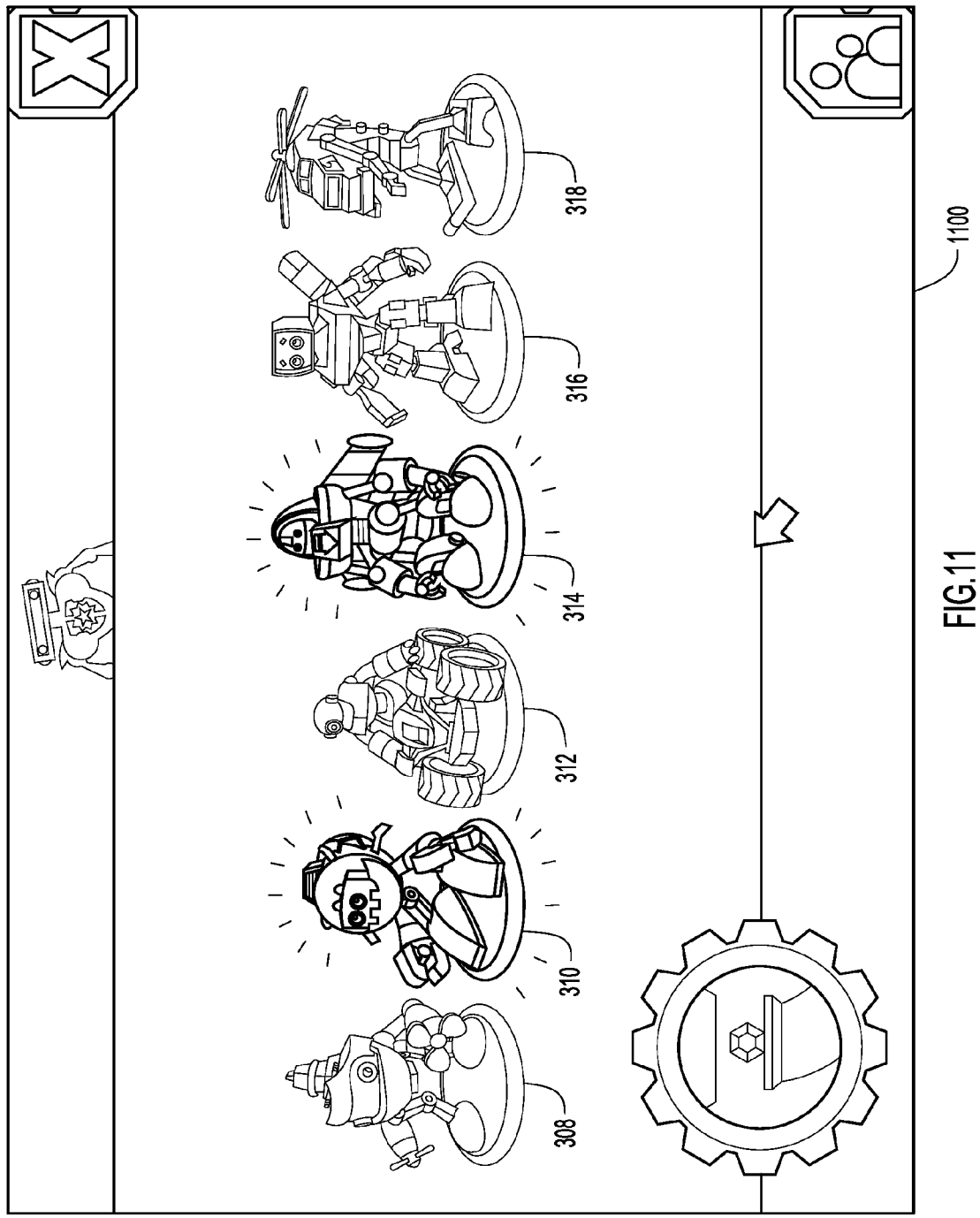
FIG. 11 is a screenshot of game access screen after a second CD-ROM has been loaded on the computer system in accordance with an embodiment of the present invention.

Referring still to FIG. 3, when, on the other hand, a pointer is placed over an inactive or locked character such as character 314, the audible cue might be: "G-Force" (which is the character's name). The announcement might also say: "G-Force is locked and unavailable for action." If a user were to click on this character another game character status screen (see screenshot 1100 of FIG. 11) may be displayed. A discussion of FIG. 11 is provided later herein.

Figure 4:
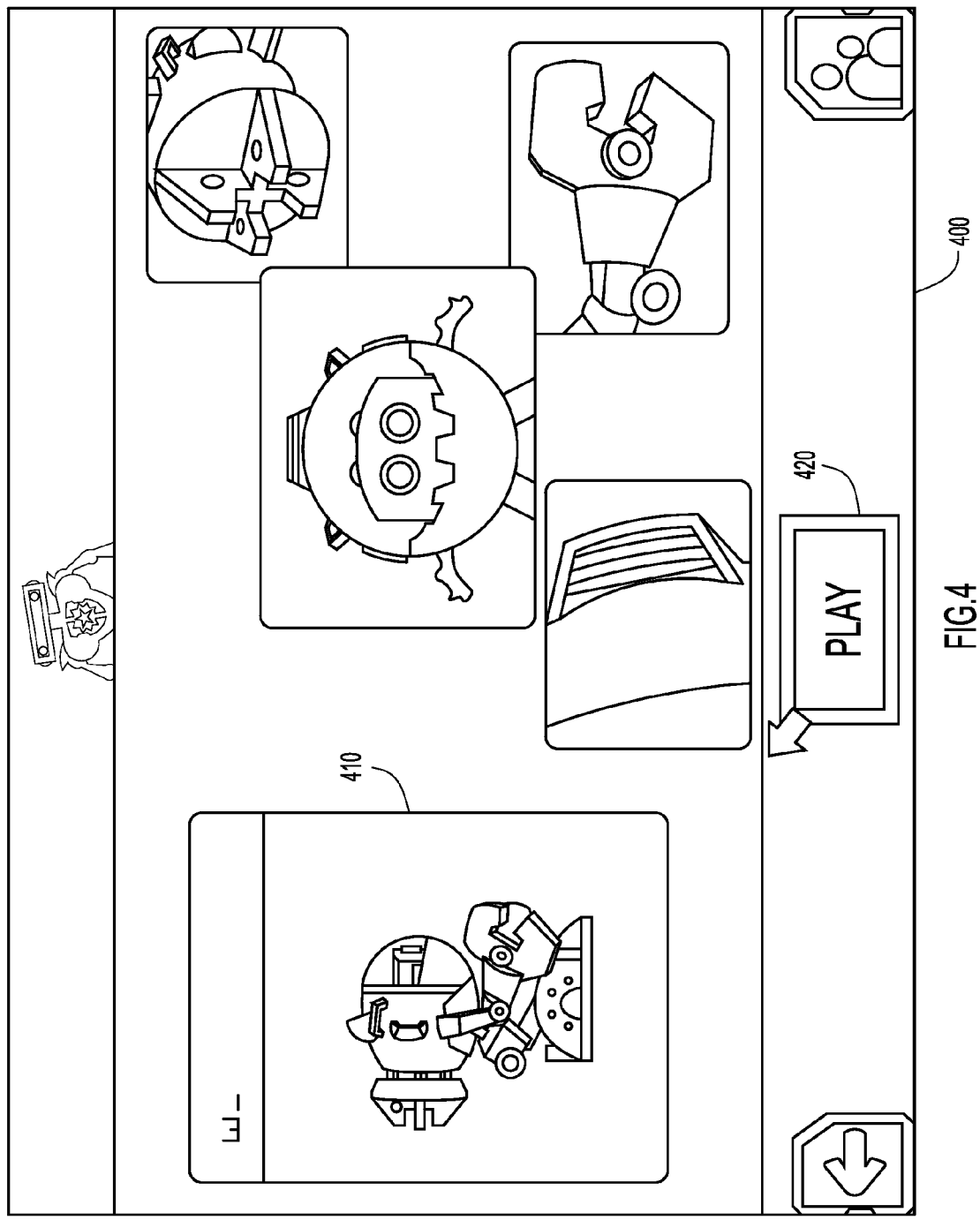
FIG. 4 is a screenshot of a game character status screen in accordance with an embodiment of the present invention.

As mentioned, in accordance with an embodiment, when a user clicks on an active game character such as character 310, a screen like screenshot 400 shown in FIG. 4 may be displayed. This screenshot 400 includes a window 410 that shows the game character, perhaps moving, twisting or revolving in slow motion as a graphical effect. When a user manipulates a pointing device to hover over window 410, an audible notice might say: "Waves . . . Status active." Thus, screenshot 400 is yet another possible place for a user to obtain status information regarding a game character. In this way, a user, perhaps a young child, can easily discern which characters are active or inactive. Button 420, when clicked, launches an interactive game, shown in FIG. 5.

Figure 5:
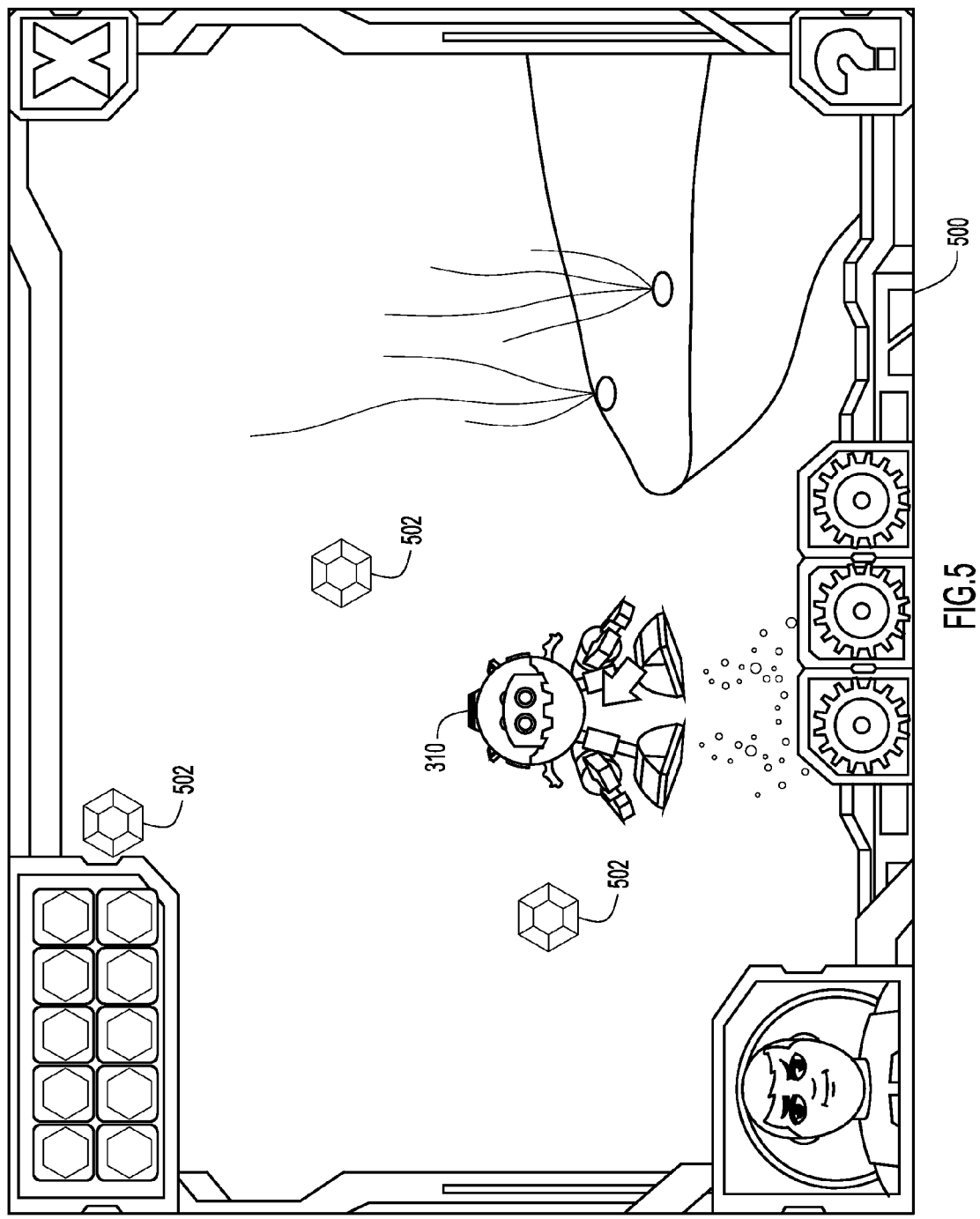
FIG. 5 is a screenshot of an example interactive game in accordance with an embodiment of the present invention.

The screenshot 500 of FIG. 5 shows one possible game that involves the specific Waves character 310 that is active in the computer game. In this particular game, the character 310 can be moved around the screen using, e.g., a mouse in an effort to "capture" crystals 502 that are moving, in this case, along multiple vertical axes. The nature of the computer game is not at all critical. This particular game is discussed only as an example to show how an active character can be selected to play an interactive game involving that character.

Figure 6:
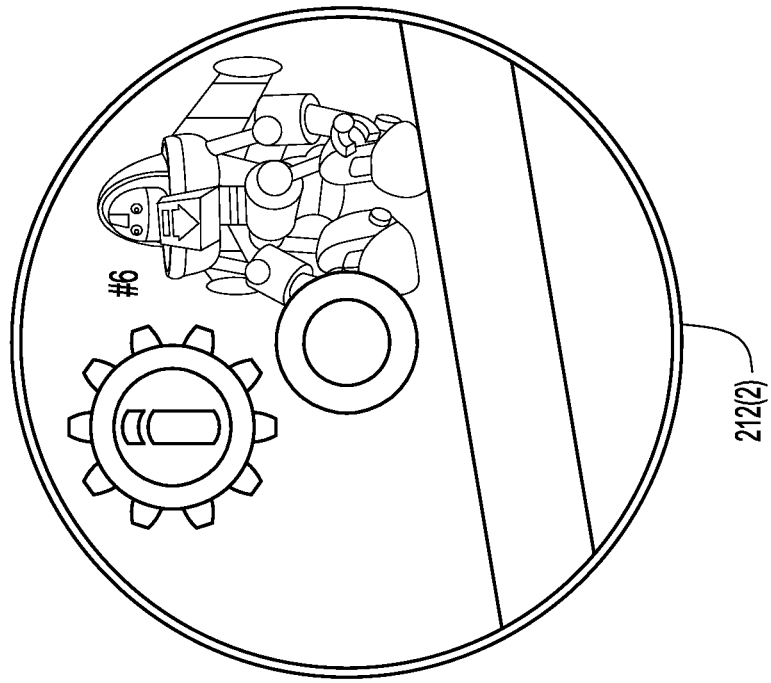
FIG. 6 depicts two CD-ROMs, each configured to activate a different game character in accordance with an embodiment of the present invention.
Figure 6:
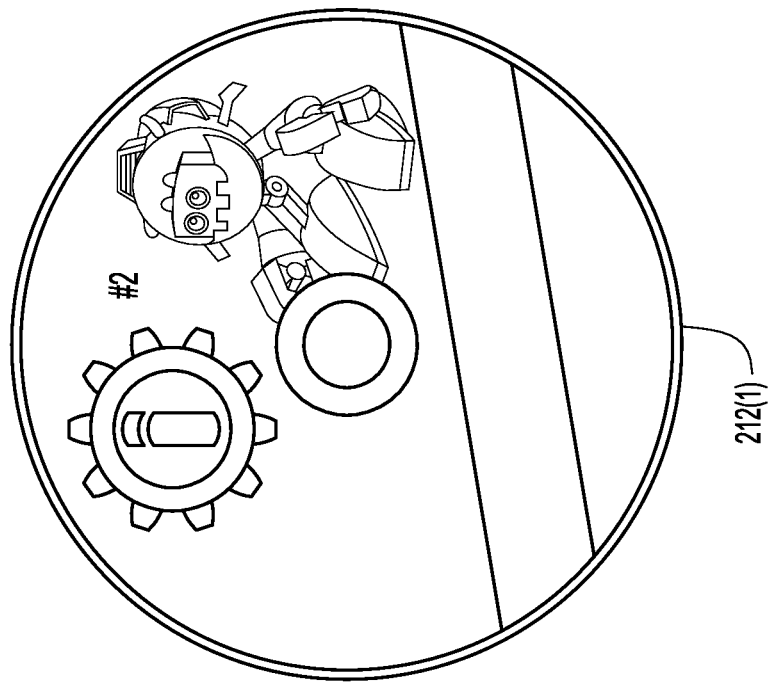

FIG. 6 shows two CD-ROMs 212(1) and 212(2). CD-ROM 212(1) includes graphics matching game character 310 (Waves). As can be seen, CD-ROM 212(1) is numbered with "#2" indicating that it is the second character/computer game out of an arbitrary number of possible toy/game characters/computer game combinations. CD-ROM 212(2) includes graphics corresponding to a different game character, in this case, G-Force game character 316. Significantly, however, while the graphics on each CD-ROM 212 might depict a different game character, all of the computer sub-games (each computer game for each game character) is resident on each CD-ROM 212. Thus, as will be explained in more detail, all of the same games are included on each CD-ROM 212(1), 212(2), 212(n), but each CD-ROM 212 is configured with software or code to unlock only a single one of the game characters and the game(s) associated with that game character.

Figure 7:
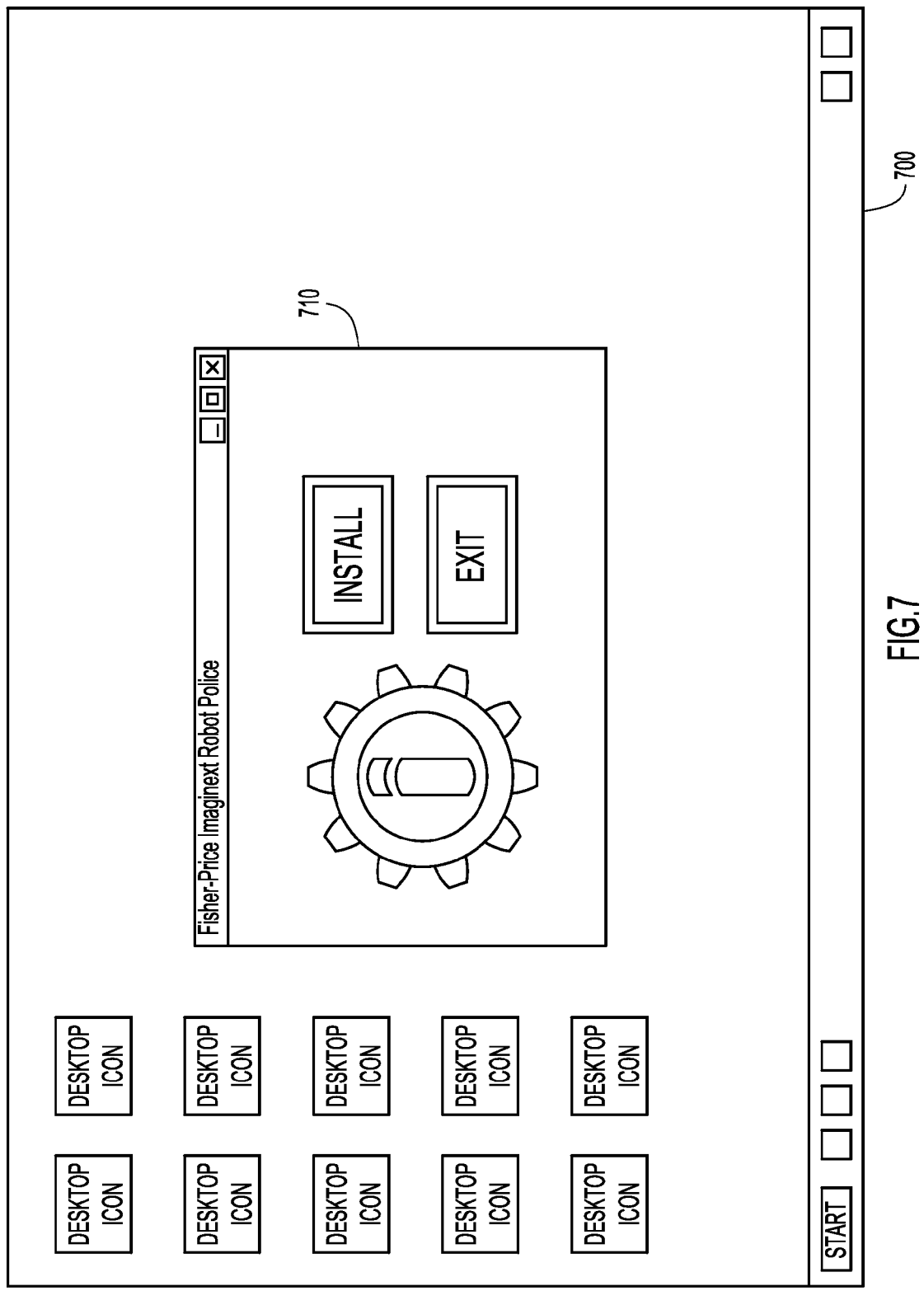
FIG. 7 is screenshot of an install screen displayed when a second CD-ROM is read by a computer system in accordance with an embodiment of the present invention.

FIG. 7 is a screenshot 700 that shows the rendering on the display 105 of the computer system when a second CD-ROM 212(2) is read by the computer system. It is assumed that software or code from a first CD-ROM 212(1) has already been loaded on the computer system, and the entirety of all computer games associated with each game character has also been loaded, but not yet activated.

Figure 8:
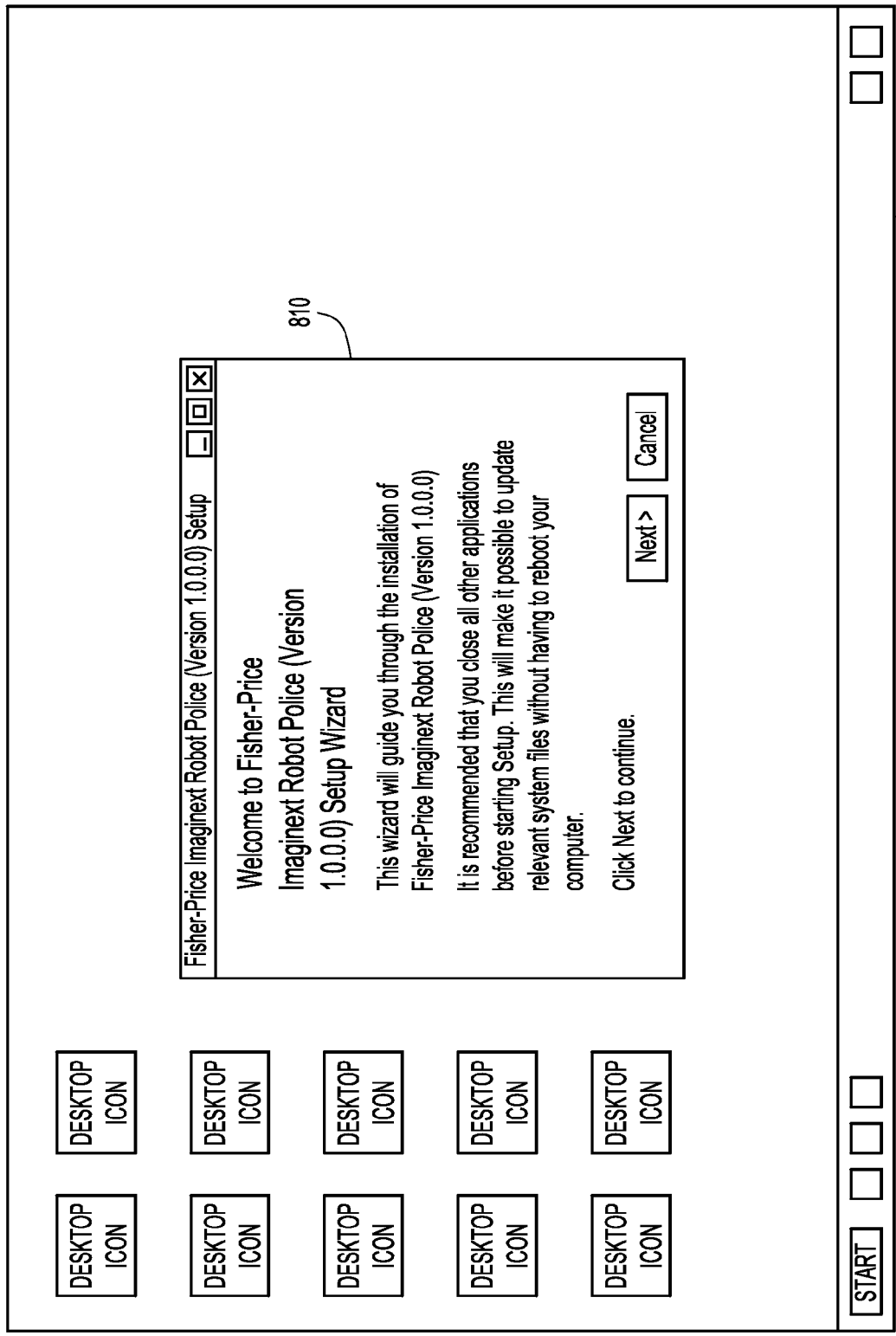
FIG. 8 is a screenshot of a setup wizard initiated by the second CD-ROM in accordance with an embodiment of the present invention.
Figure 9:
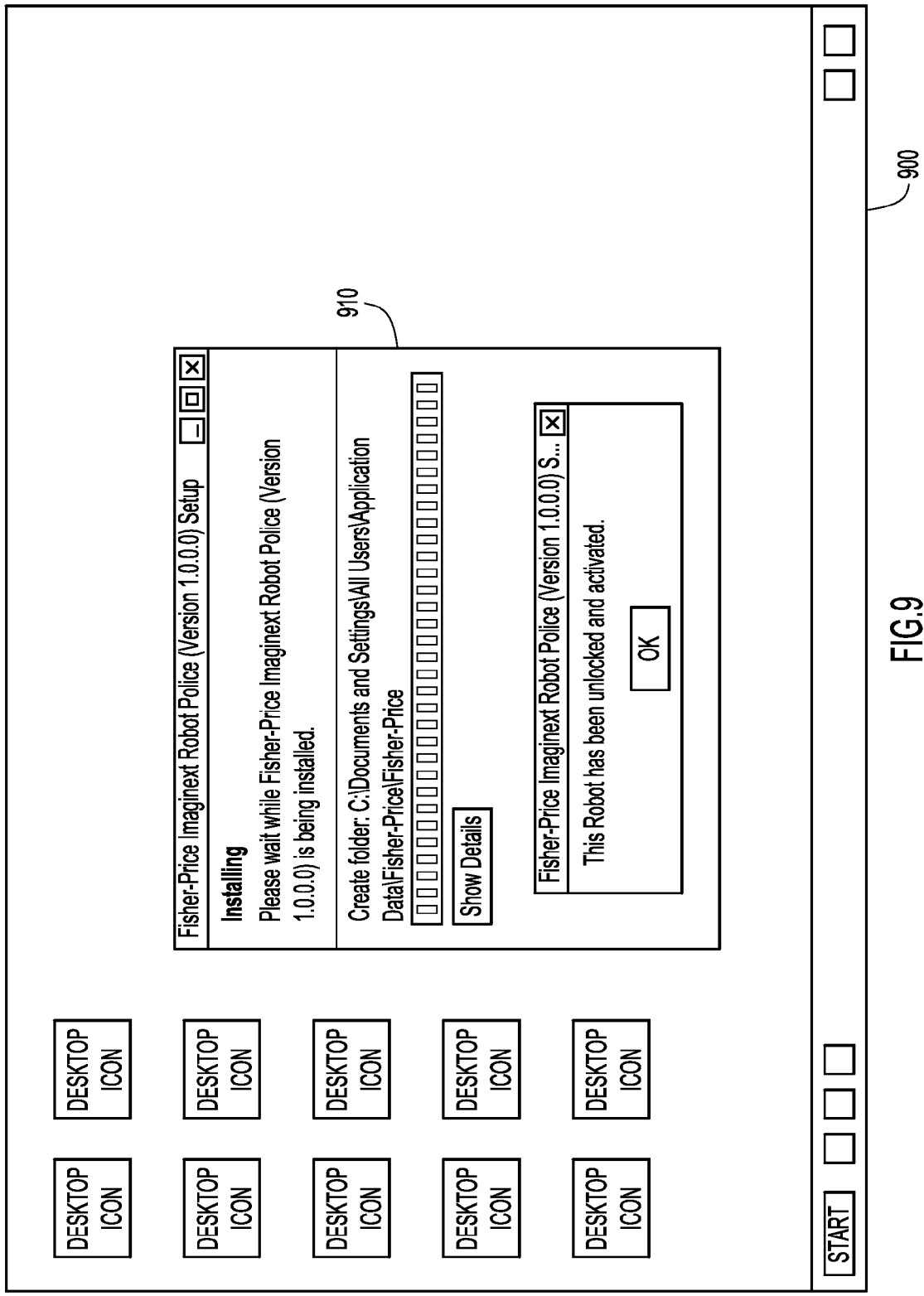
FIG. 9 is a screenshot that includes a notification window that a game character associated with the second CD-ROM has been activated in accordance with an embodiment of the present invention.

In the case of the screenshot 700 of FIG. 7, a window 710 asks whether the software on the CD-ROM 212(2) should be installed or whether the program should be exited. Assuming, a user clicks the "Install" button in window 710, the CD-ROM 212(2) is configured to start an install process including rendering a screen such as screenshot 800 of FIG. 8. Screenshot 800 includes a window 810 that asks a user to launch a setup wizard. Assuming the user clicks "next" in window 810, the software or code encoded on CD-ROM 212(2) determines whether a prior CD-ROM 212 (e.g., CD-ROM 212(1)) that includes the entire computer game also resident or encoded on the current CD-ROM 212(2) has already been installed. If so, then a screen similar to screenshot 900 of FIG. 9 may be presented. Window 910 in screenshot 900 indicates "This Robot has been unlocked and activated." In this specific implementation, "robot" is equivalent to game character. Thus, window 910 indicates to the user that the game character depicted on CD-ROM 212(2) that has been input in CD-ROM driver 109 is now active or unlocked. Significantly, because a previously installed CD-ROM 212 already loaded all of the games for all of the game characters, the game(s) encoded on most recently installed CD-ROM 212(2) need not be loaded onto the computer system. Rather, only a relatively simple configuration file change needs to occur to unlock or activate a game character associated with a newly-installed CD-ROM 212(2). This substantially increases the speed of the install process.

FIG. 10 shows an example configuration file that may be set up by software encoded on a first CD-ROM 212 and stored in a directory on the computer system, which configuration file can then be updated when a subsequent CD-ROM 212 is installed. As shown, once a second one of the CD-ROMs 212 is installed, two game characters, e.g., Waves 310 and G-Force 314 each have a bit set to one or flag set, while the remaining game characters bits or flags are not set. Thus, each time the computer game launches the software code checks the configuration file and determines which ones of the game characters to depict as being active or unlocked versus inactive or locked. Thus, again, when a subsequent CD-ROM is installed, the entire computer game need not be installed. Instead, only a configuration file, an example of which is shown in FIG. 10, needs to be updated, thereby unlocking the appropriate game character.

FIG. 11 shows screenshot 1100 of a game access screen that, in one embodiment, is displayed once CD-ROM 212(2), is loaded, read, stored and launched on the computer system. As shown, the six different game pieces or characters 308-318 are still depicted. Now, however, and in juxtaposition with FIG. 3, two of the game characters, namely characters 310 and 314 are indicated as being active (hash marks surround the game characters 310 and 314). In a color rendering, both characters 310 and 314 may be displayed in full color, while the remaining characters 308, 312 and 316-318 may be displayed in more simple gray scale. As a result, and in a similar fashion discussed with respect to FIG. 3, a user has an immediate visual indication as to which ones of the game characters are active or unlocked. Those game characters that are displayed in color are unlocked and active, and those that are locked or inactive are displayed in, e.g. gray scale.

Figure 12:
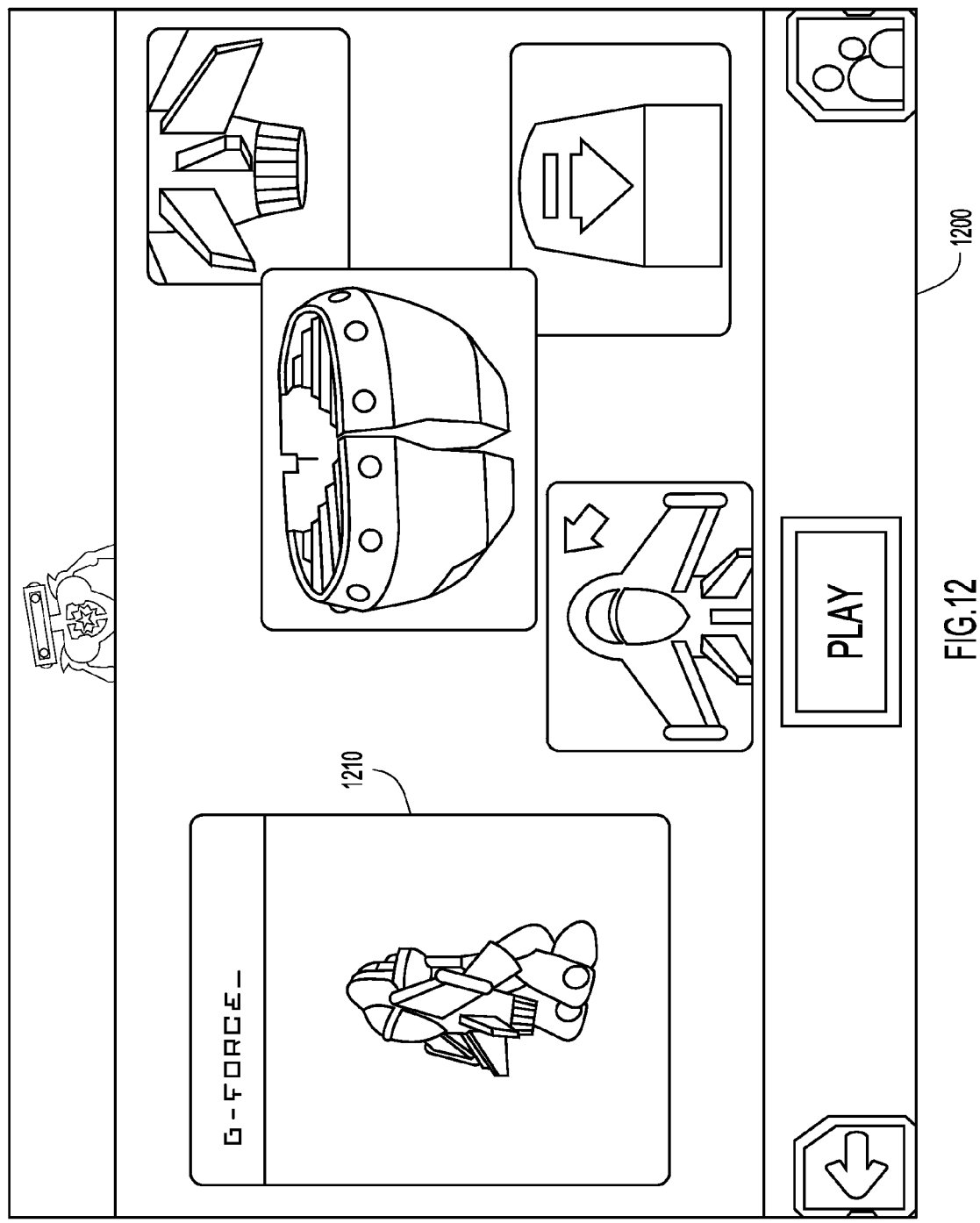
FIG. 12 is screenshot of a game character status screen after a second CD-ROM has been loaded on the computer system in accordance with an embodiment of the present invention.

A user now has a choice between selecting, or clicking on, either game character 310 (Waves) or game character 314 (G-Force). If game character 314 is selected, a screen similar to screenshot 1200 in FIG. 12 may be shown. Like the screenshot 400 of FIG. 4, screenshot 1200 may provide audible status information about the selected game character, here game character 314 (G-Force), when a pointing device is manipulated to hover over widow 1210. The game character in window 1210 may move, twist or revolve to enhance the graphical presentation. Also, as before, this game character status screen may act as a gateway to an actual interactive game, by clicking on the "PLAY" button near the bottom of the screenshot 1200. In another possible embodiment, clicking on the active character 314 in the screen depicted by screenshot 1100 may immediately initiate an interactive game associated with the character 314.

Figure 13:
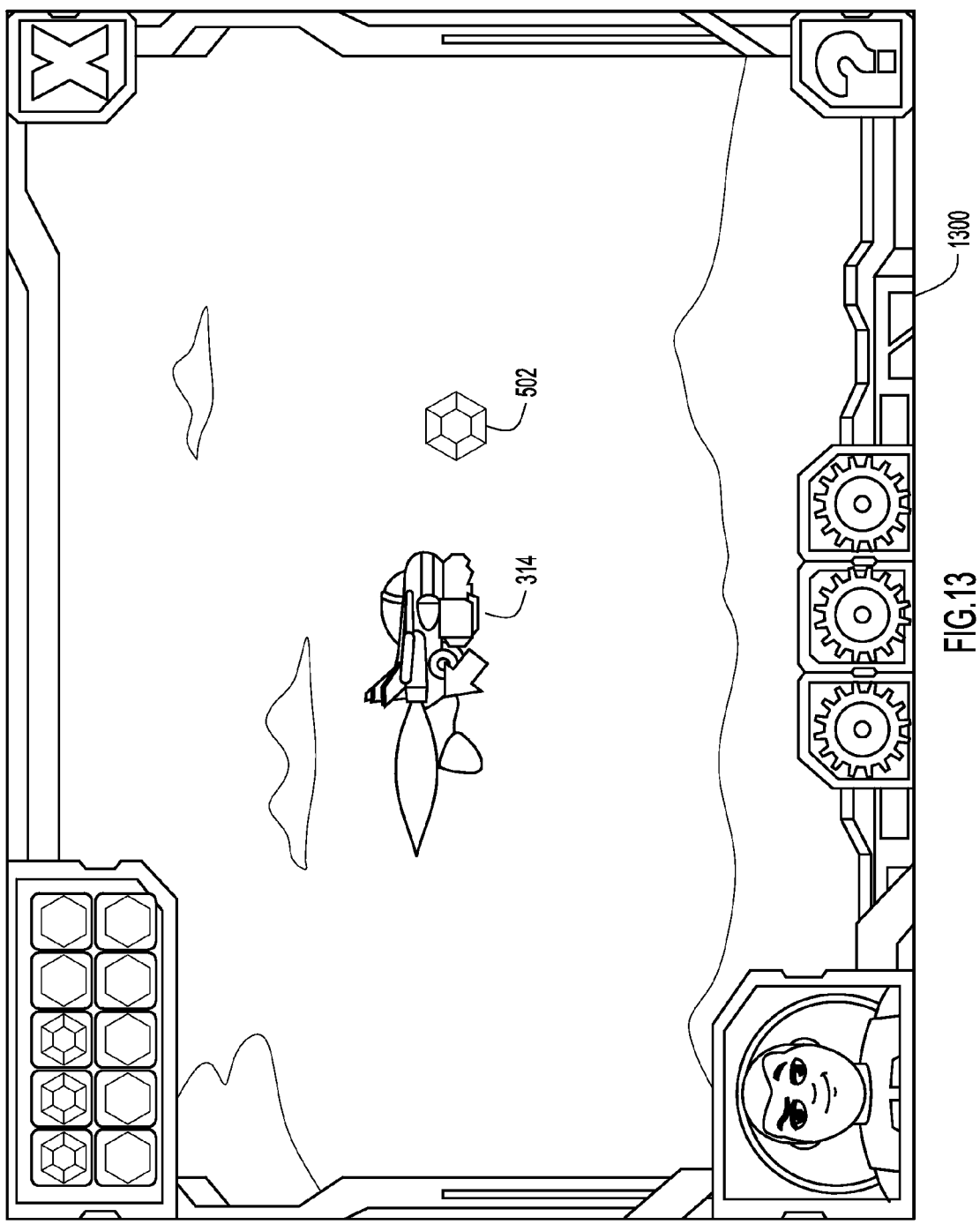
FIG. 13 is a screenshot of an example interactive game associated with the second CD-ROM in accordance with an embodiment of the present invention.

Screenshot 1300 of FIG. 13 shows an interactive game that uses game character 314 in a game similar to the game depicted in FIG. 5. In this game, however, crystals 502 moving substantially along horizontal axes and the game character can be moved to capture the crystals 502 using a pointing device, such as a mouse. Once again, the nature of the interactive game is of no particular consequence.

FIG. 14 shows an example series of steps for practicing aspects of an embodiment of the present invention. At step 1402 a CD-ROM is read. This CD-ROM (or other media) is preferably packaged and sold with a toy that resembles a game character in a game with which the CD-ROM is encoded. However, aspects of the present invention can be implemented without a co-packaged toy. At step 1404, it is determined whether the software encoded on the CD-ROM that is currently being read has already been installed on the computer. If yes, then at step 1406, and indication is provided to the user that the software is already installed and, e.g., that the CD-ROM may be removed.

If the software or code has not already been installed at step 1404, then the process moves to step 1408 where it is determined whether a similar CD-ROM (i.e., another in the series) has already been installed. In other words, is the installation a first ever installation for the computer game. If yes, then the CD-ROM is considered a "first" CD-ROM and the process continues with step 1410. At step 1410, the computer game (including all sub-games) encoded on the first CD-ROM is loaded and stored on the computer system (e.g., a hard drive or other memory device). At step 1412, in the course of loading the computer game, a configuration file is generated and stored. The configuration file is configured to provide an indication regarding whether to activate a given game character and sub-game associated with the given game character (in this case a first game character associated with the first CD-ROM).

After the installation process is complete, the game can be launched at step 1414. This can be done automatically upon completion of installation, or by a user selecting an icon on the computer.

After launch, at step 1416, the computer game is configured to show a status screen of the activated first game character along with un-activated (or locked) second and other game characters. The remainder of the game can played with the first game character.

When a second CD-ROM is read at step 1402, the process again moves to step 1404 where it is determined whether that second CD-ROM has already been installed. If not the process moves to step 1408. Here, since a first CD-ROM has already been installed, the second CD-ROM is not being used as a first installation CD-ROM. Accordingly, the process moves step 1418. At step 1418, because substantially all of the game software has already been loaded on the computer from a previously loaded CD-ROM (the first CD-ROM), the software or code encoded on the second CD-ROM updates the configuration file to indicate that a second sub-game or second game character associated with the second CD-ROM should be unlocked or activated. The computer game can then be launched at step 1420.

Then, after launch at step 1422, and in accordance with the configuration file, a status screen is shown that visually indicates that the first and second game characters are activated, along with any remaining locked or un-activated game characters.

A third and subsequent CD-ROMs can be read and loaded in this the same manner as the second CD-ROM to activate still more game characters and any associated games.

Thus, embodiments of the present invention provide a series of co-packaged products. Each product in the series includes a physical toy, action figure, or the like, along with an associated CD-ROM or other media capable of storing software code or logic that includes a computer game that uses as a game character a rendering of the physical toy with which the CD-ROM is co-packaged.

In an embodiment, each CD-ROM in the series includes all of the games that are associated with each game character in the series. Each CD-ROM is configured, if it is a first such CD-ROM being installed on the computer, to generate and store a configuration file that indicates which ones of the game characters should be activated. Thus, once a first CD-ROM of the series is installed on the computer, a subsequent install of another CD-ROM will result in a modification of the configuration file, without having to install the entire computer game again. This substantially speeds up the install process, thereby making the overall experience simpler and less stressful.

In an embodiment, an initial screen displayed by the computer game depicts all game characters in the series, visually indicating which ones of the game characters are active and inactive. This screen may thus entice a user to purchase additional co-packaged toy/computer games in a desire to unlock any or all of the inactive game characters and their associated games or sub-games.

Although the manufacture, apparatus, system or method are illustrated and described herein as embodied in one or more specific examples, they are nevertheless not intended to be limited to the details shown, since various modifications and structural changes may be made without departing from the scope of the manufacture, apparatus, system, and method and within the scope and range of equivalents of the claims. Accordingly, it is appropriate that the appended claims be construed broadly and in a manner consistent with the scope of the manufacture, apparatus, system, and method, as set forth in the following.

What is claimed is:

1. A method, comprising:
    reading, by a computer, a first non-transitory computer readable storage medium, the first non-transitory computer readable storage medium having stored thereon a computer game that includes at least two game characters, the first non-transitory computer readable storage medium being configured to cause only a first one of the game characters to be unlocked once the computer game is loaded and launched on the computer;
    displaying a status screen that shows the at least two game characters, wherein the first one of the game characters is indicated as being unlocked as compared to a second one of the game characters, which is indicated as being locked;
    reading, by the computer, a second non-transitory computer readable storage medium, the second non-transitory computer readable storage medium having stored thereon the computer game that includes the at least two game characters, the second non-transitory computer readable storage medium being configured to cause only the second one of the game characters to be unlocked; and
    displaying, after the second non-transitory computer readable storage medium is read, the status screen, wherein the status screen indicates that both the first one and the second one of the at least two game characters are unlocked.

2. The method of claim 1, further comprising indicating that the first one of the game characters is unlocked by rendering the first one of the game characters in color; and
    indicating that the second one of the game characters is locked by showing a grayed-out rendering of the second one of the game characters.

3. The method of claim 1, further comprising
    receiving an indication that one of the at least two game characters has been selected, and
    launching a specific portion of the computer game associated with the selected game character.

4. The method of claim 1, further comprising
    receiving an indication that a pointing device is hovering over one of the at least two game characters; and
    in response, generating audible status information regarding whether the game character over which the pointing device is hovering is locked or unlocked.

5. The method of claim 1, further comprising:
    maintaining, on the computer, configuration information that identifies which ones of the at least two game characters are unlocked.

6. The method of claim 5, further comprising
    loading substantially all of the computer game using the first non-transitory computer readable storage medium, and
    updating the configuration information using the second non-transitory computer readable storage medium without loading the computer game.

7. The method of claim 1, wherein the first non-transitory computer readable storage medium and the second non-transitory computer readable storage medium are respective CD-ROMs.

8. The method of claim 7, wherein the respective CD-ROMs are sold with respective toys that resemble the first one of the game characters and the second one of the game characters.

9. A method, comprising:
    co-packaging a first physical toy and associated first electronic media storing software code that includes a computer game that is configured to activate a first game character resembling the first the physical toy with which the first electronic media is co-packaged; and
    co-packaging a second physical toy and associated electronic media storing the software code and that is configured to activate a second game character resembling the second physical toy with which the second electronic media is co-packaged.

10. The method of claim 9, further comprising
    configuring the software code to indicate that the first game character is unlocked by rendering on a display the first game characters in color; and
    configuring the software code to indicate that the second game character is locked by rendering on the display a grayed-out rendering of the second game character.

11. The method of claim 9, further comprising
    configuring the software code to receive an indication that the first or second game character has been selected, and
    to launch a specific portion of the computer game associated with the selected first or second game character.

12. The method of claim 9, further comprising
configuring the software code to receive an indication that a pointing device is hovering over one of the first or second game characters; and
in response, to generate audible status information regarding whether the game character over which the pointing device is hovering is locked or unlocked.

13. The method of claim 9, further comprising
configuring the software code to maintain configuration information on a computer that identifies which ones of the first and second game characters are activated and available for use in the computer game.

14. The method of claim 13, further comprising
configuring the software code to load substantially all of the computer game using the first electronic media; and
configuring the software code to update the configuration information using the second electronic media without loading the computer game on the computer.

15. The method of claim 9, wherein the first electronic media comprises a CD-ROM.

16. A set of co-packaged items, comprising:
a first co-packaged item comprising a first physical toy and associated first electronic media storing software code that includes a computer game that is configured to activate a first game character resembling the first the physical toy with which the first electronic media is co-packaged; and
a second co-packaged item comprising a second physical toy and associated electronic media storing the software code and that is configured to activate a second game character resembling the second physical toy with which the second electronic media is co-packaged.

17. The co-packaged items of claim 16, wherein
the software code is configured to indicate that the first game character is unlocked by rendering on a display the first game characters in color; and
the software code is configured to indicate that the second game character is locked by rendering on the display a grayed-out rendering of the second game character.

18. The co-packaged items of claim 16, wherein
the software code is configured to receive an indication that the first or second game character has been selected, and
to launch a specific portion of the computer game associated with the selected first or second game character.

19. The co-packaged items of claim 16, wherein
the software code is configured to receive an indication that a pointing device is hovering over one of the first or second game characters; and
in response, to generate audible status information regarding whether the game character over which the pointing device is hovering is locked or unlocked.

20. The co-packaged items of claim 16, wherein
the software code is configured to maintain configuration information on a computer that identifies which ones of the first and second game characters are activated and available for use in the computer game.

21. The co-packaged items of claim 16, wherein
the software code is configured to load substantially all of the computer game using the first electronic media; and
the software code is configured to update the configuration information using the second electronic media without loading the computer game on the computer.

22. The co-packaged items of claim 16, wherein the first electronic media comprises a CD-ROM.

* * * * *